(No Model.)
P. BRADFORD.
GRINDSTONE HANGER.
No. 282,262. Patented July 31, 1883.
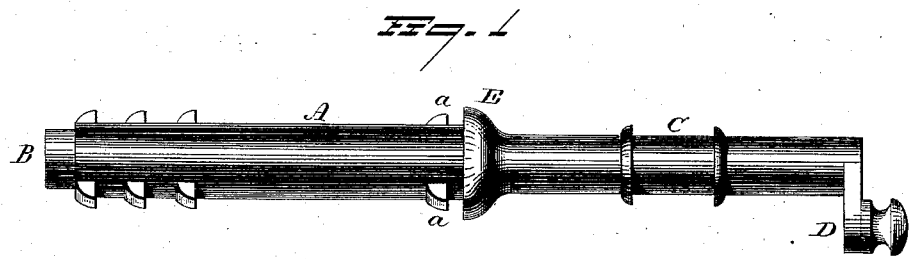
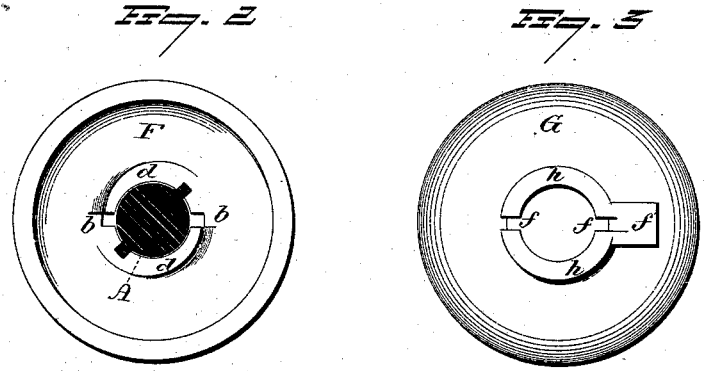
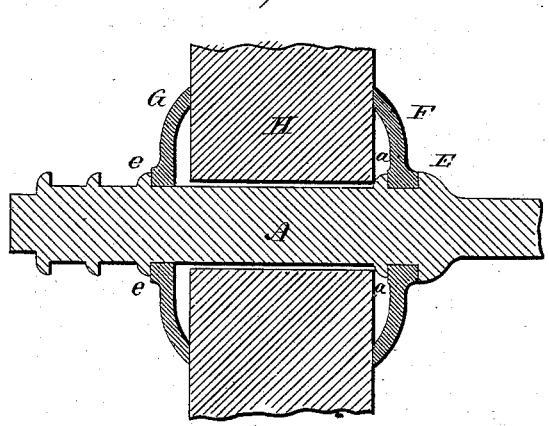

UNITED STATES PATENT OFFICE.

PURMORT BRADFORD, OF NEW HAVEN, CONNECTICUT, ASSIGNOR TO SARGENT & CO., OF SAME PLACE.

GRINDSTONE-HANGER.

SPECIFICATION forming part of Letters Patent No. 282,262, dated July 31, 1883.

Application filed January 29, 1883. (No model.)

*To all whom it may concern:*

Be it known that I, PURMORT BRADFORD, of New Haven, in the county of New Haven and State of Connecticut, have invented new Improvements in Grindstone-Hangers; and I do hereby declare the following, when taken in connection with accompanying drawings and the letters of reference marked thereon, to be a full, clear, and exact description of the same, and which said drawings constitute part of this specification, and represent, in—

Figure 1, a perspective view of the shaft; Fig. 2, an inside view of the fixed collar; Fig. 3, an outside view of the adjustable collar; Fig. 4, a longitudinal section, showing the collars as clamping the stone.

This invention relates to an improvement in the shaft for hanging grindstones—that is to say, the shaft which passes through the stone to rest in the bearings, and through which the revolution is imparted to the stone, and generally used in the smaller class of grindstones. Grindstones are made with a hole at the center much larger than the shaft upon which they are to be supported, and when placed upon the shaft wedges are driven into the hole around the shaft to center the stone upon the shaft; but to retain the stone in a plane at right angles to the shaft, collars are arranged upon the shaft to bear upon opposite sides of the stone and grip the stone between them, so as to hold it in its proper plane. In the usual construction a collar in a fixed position on one side of the stone and an adjustable collar on the opposite side are used, the adjustable collar serving to clamp the stone against the fixed collar. These shafts and collars are usually made from cast-iron. If, as in many cases, the fixed collar be cast upon the shaft, it makes it difficult to mold without an inclination upon the inner face of the collar, which interferes with the proper fitting of the collar against the side of the stone. If made separate from the shaft and screwed against a shoulder on the shaft, it increases the cost of manufacture, because of the difficulty of casting a perfect thread on the shaft, and if not perfect the casting is lost; or, if the screw be cut upon the shaft, it increases the cost of manufacture to a still greater extent. In the more general construction of these shafts the collar upon the opposite side is forced into its clamping position by means of a nut run onto a screw-thread on the shaft; but, as in regard to the other collar, this causes difficulty and expense of manufacture.

The object of my invention is to avoid these difficulties, produce a strong, simple, and durable fastening to clamp the stone upon the shaft; and it consists in the construction as hereinafter described, and more particularly recited in the claims.

A represents the portion of the shaft which is to extend through the stone, and is provided with the usual bearing, B, at one end, and near the opposite end with the second bearing, C, and at that extreme end with the usual crank, D, for the attachment of the pitman, and may also be provided with the usual hand-crank attachment.

E is an annular shoulder against which the fixed collar is to be set.

*a a* are lugs projecting radially from the shaft, and so as to leave a small space between their one side and the shoulder E, as seen in Fig. 1.

F is the fixed collar, of about the usual circumference and external shape, with an opening through it of substantially the diameter of the shaft A; and at diametrically-opposite sides of the opening a notch, *b*, is formed, corresponding to the lugs *a*, so that when the collar is passed over the shaft the notches will escape the lugs and permit the collar to come against the shoulder E. Around the opening and between the notches the inner surface of the collar is inclined, rising from one notch toward the other, as at *d d*, Fig. 2, the thickness of the collar at the notch slightly less than the space between the lugs and the collar, but gradually increasing from the respective notches, so that after the collar has been set against the shoulder it is turned to bring the inclines hard against the respective lugs until the collar be firmly wedged between the lugs and shoulder, as seen in Fig. 4. Thus the collar is firmly secured to the shaft, and for all practical purposes as firmly as if cast thereon.

G represents the collar for the opposite side of the stone. On the portion of the shaft through which this collar is to be placed radially-projecting lugs *e* are formed, substantially like the lugs a. These may be in series of several lugs, as seen in Fig. 4, each in advance of the other. The collar G is constructed with an opening to pass over the shaft, and at diametrically-opposite points a notch, f, is formed in the opening, as seen in Fig. 3, and on the outside of the collar, from each notch toward the other, is an inclined surface, h, forming substantially a circular wedge shape, as in the case of the first collar.

The stone H having been set against the fixed collar F, the adjustable collar G is placed against it upon the opposite side, and so that the inclined surfaces h will come against the respective lugs on the shaft, and then turned to bring the inclines h against the lugs, the collar being forced into firm clamping position against the stone. The hole through the stone is square, and is shown in Fig. 4 in section, cutting through in a plane parallel with one of the sides of the opening. In introducing the shaft through the opening in the stone it will be understood that the lugs will pass through in a plane diagonally across the opening, the opening being sufficient for such free passage of the lugs. By providing the shaft with two or more lugs the extent of adjustment of the adjustable collar is proportionately increased; or one pair or set only of lugs may be employed, they being in a position to accommodate the thickest stone required. In that case a packing may be introduced between the collars and the stone, so that the collar will be able to clamp the stone. This arrangement of the fixed collar may be employed where the shaft is provided with the usual screw-thread and nut to adjust the other collar; or this adjustable collar may be used with a fixed collar upon the opposite side. The adjustable collar is constructed with a lug, f, or any suitable device by which an instrument may be applied to forcibly turn it on the shaft to bring it to its proper clamping position. By this construction the entire article is produced in the process of casting, and needs no other finishing than that which may be made in the common tumbling process, and the cost of the article is greatly reduced from the usual construction. Again, by making both the collars detachable and so readily adjustable that an inexperienced person may apply them, the construction enables the shaft and collars to be arranged in so compact a condition as to save a large amount of space over that required in packing the usual construction. I have represented the lugs on the shaft as diametrically opposite each other; but this relative position or number of the lugs may be varied, if desired.

I have described and illustrated the inclines on the outside of the collar G as a fixed and permanent part of the collar; but it will be observed that the outer surface of the collar may be made in a plane at right angles to the axis of the shaft, or parallel with the face which bears against the stone, and wedges driven between the outside face and the adjacent lugs, and thereby wedge the collar against the stone. I therefore do not wish to limit my invention to the precise construction of collars shown in the illustration.

I claim—

1. The combination of the shaft A, constructed with an annular shoulder, E, and with lugs a, with the collar F, having an opening to pass over the shaft, and with notches for the lugs a to permit the collar to reach the shoulder, the said collar constructed with inclines d upon its inner surface, substantially as described.

2. The combination of the shaft A, constructed with an annular shoulder, E, and with lugs a, and also with projecting lugs e, the collar F, having an opening to pass over the shaft, and with notches to pass the lugs e and lugs a to permit the collar to reach the shoulder E, said collar E constructed with inclines d upon its inner surface, the collar G constructed with an opening to pass on over the shaft, and with notches in said opening to pass the said lugs e, and inclines arranged to bear against the lugs e and force the said collar G against and so as to clamp the stone between the said two collars, substantially as described.

PURMORT BRADFORD.

Witnesses:
WM. S. COOKE,
I. B. SARGENT.